(12) United States Patent
Chang

(10) Patent No.: US 7,606,855 B2
(45) Date of Patent: Oct. 20, 2009

(54) SYSTEM AND METHOD FOR MESSAGE HANDLING USING MESSAGE INTERCEPTORS

(75) Inventor: Shean-Guang Chang, Morris Plain, NJ (US)

(73) Assignee: Bea Systems, Inc., Redwood Shores, CA (US)

( * ) Notice: Subject to any disclaimer, the term of this patent is extended or adjusted under 35 U.S.C. 154(b) by 764 days.

(21) Appl. No.: 11/133,567

(22) Filed: May 20, 2005

(65) Prior Publication Data

US 2006/0031176 A1    Feb. 9, 2006

Related U.S. Application Data

(60) Provisional application No. 60/573,208, filed on May 21, 2004.

(51) Int. Cl.
G06F 15/16    (2006.01)

(52) U.S. Cl. .................... 709/202; 709/206
(58) Field of Classification Search ........... 709/206, 709/202; 717/130; 719/316
See application file for complete search history.

(56) References Cited

U.S. PATENT DOCUMENTS 7,194,664 B1 *   3/2007   Fung et al. ............... 714/45
2002/0099738 A1 *  7/2002   Grant ...................... 707/513

* cited by examiner

Primary Examiner—Nathan J. Flynn
Assistant Examiner—Chirag R Patel
(74) Attorney, Agent, or Firm—Fliesler Meyer LLP

(57) ABSTRACT

A system including an interception service that serves as a discovery mechanism and framework for carriers to connect to processors. The system allows for message handling using message interceptors, comprising one or more message carriers for receiving and handling messages; one or more message processors for processing messages; and an interception service that registers interception points in the message carriers for allowing message processors to access the message.

18 Claims, 1 Drawing Sheet

SYSTEM AND METHOD FOR MESSAGE HANDLING USING MESSAGE INTERCEPTORS

CLAIM OF PRIORITY

This application claims priority from provisional application entitled SYSTEM AND METHOD FOR MESSAGING HANDLING USING MESSAGE INTERCEPTORS, Application No. 60/573,208, filed May 21, 2004, by Shean Chang, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is related generally to application servers and messaging systems, and specifically to a system and method for message handling using message interceptors.

BACKGROUND

In an application server environment, a message broker is a configurable intermediary that can process messages and make high-level decisions about how they should be handled. Message brokers support routing, filtering, transforming, duplicating and various other simple operations on messages. Message brokers are connected to normal processing paths by either being the explicit destination for a message or by intercepting messages intended for some other destination.

What is desirable is a means for taking responsibility off of the carriers and processors. One approach is to put a message broker interception code into the proper processing paths. However, a better approach would be to separate the notion of interception from the description of processing. The only existing standard that is similar to this is JAX-RPC handler chains. However, while JAX-RPC handler chains describe the processing of messages, they do not offer a flexible means of registering message carriers with message processors.

SUMMARY

In accordance with an embodiment of the invention, an interception service serves as a discovery mechanism and framework for carriers to connect to processors. If desired, a separate feature can be built that implements handler chains on top of the interception service as a type of processor.

DETAILED DESCRIPTION

Figure 1:
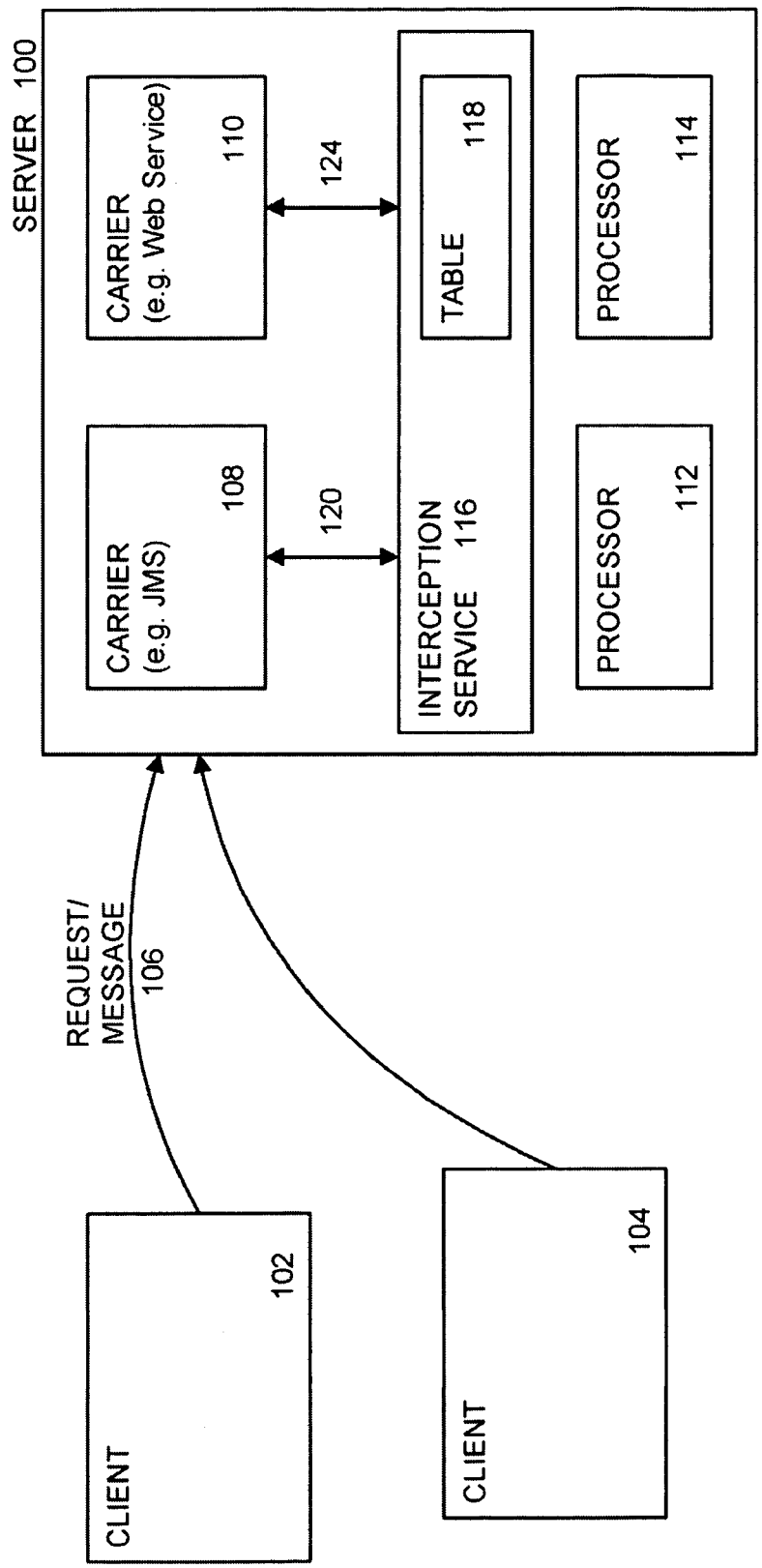
FIG. 1 shows an illustration of an environment including a system which uses message interceptors in accordance with an embodiment of the invention.

Interception is the insertion of processing code in the normal flow of control of a program. This inserted code is given the power to supersede the standard processing or to complement it. As described herein an interception service for message handling elements of the WebLogic Server (WLS) is described. Other types of application server may use and benefit from the feature. There are four goals driving this design: loose coupling, extensibility, dynamic manageability and minimality of performance impact.

In accordance with an embodiment, the system includes the Message Interception Service (interception service) as well as the framework that it provides to those who are making messages available to be intercepted (these are termed Message Carriers or, for convenience, carriers) and those who are processing these messages (termed Message Processors or, simply, processors).

The central premise guiding the feature is taking responsibility off of the carriers and processors. With that in mind, the guiding principles in defining the interception service are as follows: loose coupling between processors and carriers, extensibility to support new carriers or processors over time, manageability to support monitoring and configuration without special code in either and minimal performance impact, so that the carriers can continue to function without fear that enabling interception will cripple their performance.

The following is a brief definition of terms used throughout this document:

Carrier—Software that has messages to be intercepted.

Interception Point—The abstract notion of a place in the code where a carrier makes messages available to be intercepted.

Processor—Software that processes intercepted messages.

Interception Service—An administered service that associates processors with interception point.

Message broker—An intermediary that gives administrative control to message routing and transformation.

JAX-RPC Handler—A java interface. (javax.xml.rpc.handler.Handler) that describes message processing functions for SOAP JAX-RPC Handler Chain—Handlers are run in an ordered list, described by javax.xml.rpc.handler.HandlerChain.

Interception Service

The interception service is an administrable table of associations between interception points and processors. It is also a table of processor information. As such, the interception service provides a framework for the behavior of carriers and processors with respect to interception.

FIG. 1 shows an illustration of an environment including a system which uses message interceptors in accordance with an embodiment of the invention. As shown in FIG. 1, server 100 includes a plurality of carriers, for example a JMS carrier 108 and a Web service carrier 110. The server also includes a plurality of processors 112, 114. An interception service 116 associates processors with interception points, by using a table 118 of associations between the names of interception points and the names of processors. During normal operation, messages are received 106 at the server from clients 104, 104 or message producers. When a carrier reaches an interception point, its job is to call 120, 124 the interception service to reach any processors that may be associated with this particular interception point.

Interception Service Configurator

The interception service is designed to be administered through static method calls which add, remove and modify associations and processor information. While these calls can and should be made by various elements of the system, a part of the system is dedicated to storing interception service configuration information termed the Interception Service Configurator (ISC). The configuration information can be passed through dynamic deployment of modules. This specification will not discuss the use of modules at the present time; instead, the focus will be on what runtime and configuration information will be available.

Interception Service Functional Description

The interception service allows processors and interception points to be named and the administrator to choose which to connect to which.

In accordance with an embodiment there are seven operations provided by the interception service: Interception Point Description, Interception Point Registration, Processor Type Registration, Processor Registration, Interception Point/Processor Association, Run-Time Control and Interception.

There is one interception service on each server (for example Weblogic Server). It is assumed, however, that all interception service instances across the cluster will be configured uniformly.

Interception Point Description

Each interception point type may have a different naming scheme. Through the registerInterceptionPointNameDescription method, the carrier informs the interception service about the naming scheme of the interception points that it will register. The description includes information for each part of the name: a name, a validation function and the number of acceptable values for the name (if the name can only take on a limited number of values, this is useful information to the interception service).

Alternatively, all names, independent of interception point type, may simply be a triple: interception point type, location and name.

Interception Point Registration

When the carrier reaches a point in its execution where it is aware of an impending interception point, it registers the existence of that interception point with the interception service via the registerInterceptionPoint call that it provides. It is returned a handle through which it calls the interception service which in turn calls the processor and with which it can unregister.

Processor Type Registration

When a processor framework, like the message broker, boots, it registers its processor type with the interception service through the registerProcessorType call. It also specifies a factory with which processor instances can be created by the interception service.

Processor Registration

When configuration information is available about processors (for example, when the ISC boots), the interception service is called to add to the list of configured processors through the addProcessor method. The interception service in turn invokes the particular processor type's processor factory in order to get a processor for runtime use. If the particular processor type is not yet registered, this act will be deferred until registration. However, a handle is returned to the caller in either case.

Run-Time Control

The basis of the interception service is a table of associations between names of interception points and names of processors. The interception service provides calls such as addAssociation, through which an association can be added to the table; removeAssociation, through which an association can be removed from the table; and getAssociationHandle and getAssociationHandles through which an individual association can be found or the complete set of associations can be enumerated.

Interception

When a carrier reaches an interception point, its job is to call the interception service to reach any processors that may be associated with this particular interception point.

In the non-optimized view of this, it creates an object that implements the MessageContext interface (from the JAX-RPC standard—javax.xml.rpc.handler.MessageContext) and calls a process method of the handle that the interception service provided during registration. This will invoke the corresponding process method of the associated processor, if one exists.

This can be optimized somewhat by querying the interception service before creating the MessageContext to see if there is an association configured for this interception point. This would save the possibly superfluous creation of the MessageContext.

Configuration

The interception service is configured as a set of interception point/processor associations. The table of associations can be searched and modified from outside the interception service. Further, it is possible to enable and disable individual associations dynamically. Lastly, any modifications to this table should be transparent to the carriers and processors (excepting that processors may request to be informed of changes to its associations, see "Processor Awareness").

Processor Registration

The interception service supports a registration mechanism for processors. Each registration must use a unique name. A handle is returned with which the processor can determine the interception points with which it is associated. A processor may deregister using the handle as well.

Processor Shutdown

When a processor misbehaves (e.g. throws a runtime exception), the interception service will forcibly shutdown the offending processor. The processor will be informed of this event through the invocation of its on Shutdown method. It is assumed that the processor will inform the administrative software of this occurrence and that it will respond accordingly. It may choose to simply reenable the processor by removing and adding it.

The interception service makes it possible for external modules to see whether an association has a processor that is in the shutdown state (i.e. has been shutdown but has not been reenabled).

Processor Awareness

The processor may specify a method to be invoked to be notified about changes to the state of its associations. There are two events currently which are considered to be state changes: when the number of associated interception points goes from nonzero to zero and when the number of associated interception points goes from zero to nonzero. This is useful since processors may free or allocate resources when these events occur.

Interception Point Naming Scheme

An interception point must follow the naming scheme that is described by its interception point type. The interception service verifies that this is so and, otherwise, throws an exception.

Multiple Interception Point Registration

It is expected that a carrier will register with the same interception point name multiple times. Each registration may or may not return the same handle.

Single Association for Interception Point

A particular interception point name may only occur once in the table of associations of the interception service. An attempt to add an association with the same interception point name as an existing association will throw an exception.

Processor Uniqueness

Each processor must register with a unique name. An attempt to register a processor with the same name as a processor which has already registered will cause an exception.

Processor Necessity

Interception point processing is deemed as necessary for the proper functioning of the carrier. If there is an association configured for an interception point, yet no corresponding processor has registered (or the processor has unregistered or been shutdown), an InterceptionServiceException is thrown to the carrier when it attempts to invoke its associated processor. In other words, a carrier cannot function without its associated processor.

Thread Resource Conservation

The Interception Service needs certain guarantees from the processor for proper behavior. It needs to know that processor shutdown notification and processor state change notification calls will return promptly. The Interception Service provides similar guarantees to its callers. All administrative calls may be assumed to be of short duration. This includes adding and removing association, registering and unregistering interception points and registering and unregistering processors.

Superseding Message Flow in the Processor

The interception framework gives the processor the ability to say to the carrier that it has processed the message and that the carrier should not continue its processing. This is communicated via the return code of the process method. The interception service is not really involved in this; it is merely specified here that the carrier should interpret the return code as described.

Disallowing Superseding in the Processor

When it reaches an interception point, the carrier may be at a point in its processing where it cannot allow the destination of its message to be superseded. A call, process only, is provided by the interception service and by the processor, which only gives the processor the ability to read and write the message, but does not give the processor the opportunity to tell the carrier whether or not to allow the message to continue along its current path.

A flawed configuration may cause a processor whose only function is to make such decisions to be called in this way. It is assumed that the processor will throw an exception which will cause the interception service to shut down the processor as described above.

Processor Exceptions

The interception framework defines exceptions of two types: one that indicates a problem that is not related to the particular message being processed and one that indicates a problem that is related to the message. Further, the exception may indicate whether the problem is perceived to be of short or long duration.

Interception Point Statistics

The interception service must gather statistics for each association that is configured. It should keep track of the number of times the processor is invoked as well as the number of times that the processor supersedes the original destination of the message.

Due to the nature of interception, the statistics may indicate something slightly different than expected. For a JMS example, if a transaction is rolled back, then a consumer side processor may see the same message twice and the statistics will reflect that occurrence. Therefore, the number of messages intercepted may be different than the number of messages received by JMS, as reported by JMS.

Logging

The interception service will provide logging that will note each time a processor registers, as well as each time an association is added or removed.

Java Programming Interfaces

The Java interfaces are provided here for reference.

```
public class InterceptionException extends Exception {
    public InterceptionException(String reason) {
        super(reason);
    }
    public InterceptionException(String reason, Throwable cause) {
        super(reason, cause);
    }
}
public class InterceptionServiceException extends Exception {
    public InterceptionServiceException(String reason) {
        super(reason);
    }
    public InterceptionServiceException(String reason, Throwable cause)
    {
        super(reason, cause);
    }
}
public class MessageContextException extends Exception {
    public MessageContextException(String reason) {
        super(reason);
    }
    public MessageContextException(String reason, Throwable cause) {
        super(reason, cause);
    }
}
public interface AssociationHandle {
    AssociationInfo getAssociationInfo( ) throws
    InterceptionServiceException;
    void activate( ) throws InterceptionServiceException;
    void deactivate( ) throws InterceptionServiceException;
}
public interface AssociationInfo {
    String getInterceptionPointType( ) throws
    InterceptionServiceException;
    String[ ] getInterceptionPointName( ) throws
    InterceptionServiceException;
    String getProcessorType( ) throws InterceptionServiceException;
    String getProcessorName( ) throws InterceptionServiceException;
    boolean hasProcessor( ) throws InterceptionServiceException;
    boolean isActivated( ) throws InterceptionServiceException;
    boolean isProcessorShutdown( ) throws
    InterceptionServiceException;
    long getTotalMessagesCount( ) throws InterceptionServiceException;
    long getContinueMessagesCount( ) throws
    InterceptionServiceException;
    long getInProgressMessagesCount( ) throws
    InterceptionServiceException;
    long getProcessorRegistrationTime( ) throws
    InterceptionServiceException;
}
public interface AssociationListener {
    void onAddAssociation(
        String interceptionPointType,
        String[ ] interceptionPointName,
        String processorType,
        String processorName,
        boolean activated,
        int depth
    );
    void onRemoveAssociation(
        String interceptionPointType,
```

```
        String[ ] interceptionPointName,
        String processorType,
        String processorName
        );
public interface CarrierCallBack {
    void onCallBack(
        boolean continueOn
    );
    void onException(
        InterceptionProcessorException exception
    );
}
public interface InterceptionCallBack {
    void onCallBack(
        boolean continueOn
    );
    void onException(
        InterceptionProcessorException exception
    );
}
public interface InterceptionPointHandle {
        String getType( );
        String[ ] getName( );
        AssociationInfo getAssociationInfo( );
        boolean hasAssociation( ) throws InterceptionServiceException;
        void processOnly(MessageContext messageContext)
            throws InterceptionException, MessageContextException,
    InterceptionServiceException;
        boolean process(MessageContext messageContext)
            throws InterceptionException, MessageContextException,
    InterceptionServiceException;
        void processAsync(
            MessageContext messageContext,
            CarrierCallBack callBack
        ) throws InterceptionException, MessageContextException,
    InterceptionServiceException;
        void processOnlyAsync(
            MessageContext messageContext,
            CarrierCallBack callBack
        ) throws InterceptionException, MessageContextException,
    InterceptionServiceException;
}
public interface InterceptionPointNameDescriptionListener {
        void onRegister( );
        String getType( );
}
public abstract class InterceptionPointNameDescriptor {
        public static String DEFAULT_PREFIX_NAME =
        "NAME_SEGMENT";
        public static int UNRESTRICTED_VALUE =
        Integer.MAX_VALUE;
        public static String getDefaultPrefixName( ) {return
    DEFAULT_PREFIX_NAME;}
        public abstract String getTitle( );
        public abstract int getTotalNumberOfUniqueValue( );
        public abstract boolean isValid(String value);
}
public interface InterceptionService {
    AssociationHandle addAssociation(
            String interceptionPointType,
            String[ ] interceptionPointName,
            String processorType,
            String processorName,
            boolean activated
            ) throws InterceptionServiceException;
    AssociationHandle addAssociation(
            String interceptionPointType,
            String[ ] interceptionPointName,
            String processorType,
            String processorName,
            boolean activated,
            int depth
            ) throws InterceptionServiceException;
    void removeAssociation(
            AssociationHandle associationHandle) throws
    InterceptionServiceException;
    void registerInterceptionPointNameDescription(
            String interceptionPointType,
            InterceptionPointNameDescriptor[ ] descriptor,
        AssociationListener listener
        ) throws InterceptionServiceException;
    void registerInterceptionPointNameDescriptionListener(
        InterceptionPointNameDescriptionListener listener
        )throws InterceptionServiceException;
        InterceptionPointNameDescriptor[ ]
    getInterceptionPointNameDescription(String interceptionPointType);
        InterceptionPointHandle registerInterceptionPoint(String
    interceptionPointType, String[ ] interceptionPointName);
        void unRegisterInterceptionPoint(InterceptionPointHandle handle)
    throws InterceptionServiceException;
        void registerProcessorType(String name, Object factory) throws
    InterceptionServiceException;
        ProcessorHandle addProcessor(String type, String name, String
    metaData) throws InterceptionServiceException;
        void removeProcessor(ProcessorHandle handle) throws
    InterceptionServiceException;
        void removeProcessor(String type, String name) throws
    InterceptionServiceException;
        Iterator getAssociationHandles( );
        AssociationHandle getAssociationHandle(String type, String[ ]
    name) throws InterceptionServiceException;
        Iterator getProcessorHandles( );
        ProcessorHandle getProcessorHandle(String type, String name)
    throws InterceptionServiceException;
}
public interface Processor {
        String getType( );
        String getName( );
        boolean process(MessageContext mc, AssociationInfo associate)
        throws InterceptionException, MessageContextException;
        void processOnly(MessageContext mc, AssociationInfo associate)
            throws InterceptionException, MessageContextException;
        void processAsync(MessageContext mc, AssociationInfo associate,
        InterceptionCallBack callBack)
            throws InterceptionException, MessageContextException;
        void processOnlyAsync(MessageContext mc, AssociationInfo
    associate, InterceptionCallBack callBack)
            throws InterceptionException, MessageContextException;
        void onShutdown( );
        void associationStateChange(boolean active);
}
public interface ProcessorFactory {
        Processor create(String name, String metadata) throws
    InterceptionServiceException;
}
public interface ProcessorHandle {
        AssociationInfo[ ] getAssociationInfos( );
        String getType( );
        String getName( );
}
```

Interception Service Configurator

While MBeans which correspond to the management interfaces of the interception service are mostly straightforward, there is one type of MBean which requires more explanation. As described above, the interception service allows different interception point types to have different naming schemes. Therefore, there needs to be a different MBean for associations with each of the different interception point types. The following section discuss the carriers' (for example JMS and Web Services) relationships to the interception service.

Sample Chronology

The following example illustrates an initialization and running of the interception service in which there is just one carrier, JMS, and all processors are part of the message broker. Further, this example assumes that all processors and associations are configured through the ISC.

After boot, the message broker comes up first. It merely calls a hard-coded line which tells the interception service its name ("message broker") and its processor factory.

Next, the ISC reads its Mbeans. In this example, these MBeans identify one processor and one association. The processor is of type "message broker", with name "Route Through Chicago Office" and has the associated configuration information that the message broker needs. The interception service configurator calls the interception service to describe this processor. The interception service in turn calls the processor's factory to create a processor. Next, the ISC adds its one configured association to the interception service. Let us assume that this association is the following pair—the (multipart) name of the interception point is "S1", "Q1", "Incoming" and the name of the processor is "Route Through Chicago Office".

Next, JMS starts. It calls the interception service to describe its naming scheme. Its naming scheme is that it has a server name (which can take on any value), a destination name (which can take on any value) and a location (which can be either "incoming" or "outgoing"). That is it for now.

Next, let us assume that a JMS producer starts, JMS registers an interception point with the name "S2", "Q2", "incoming". Let us assume that a consumer comes up next and JMS registers the name "S1", "Q1", "outgoing". The reader will notice that neither of these interception points actually has a processor associated with it. So, when JMS receives a message from the previously mentioned producer, it asks the interception service if there are any processors associated with this particular point. Since there is no processor associated with this name, JMS simply continues its processing.

Finally, another producer starts which has the interception point named "S1", "Q1", "incoming". When a message is received by the JMS server through this producer, the interception service will now have an associated processor. So, the JMS code creates a MessageContext and calls the interception service to process the message. The interception service, in turn, calls the processor to process it—unless it has unregistered in that millisecond in which case it will just return true. The processor may return true or false; if it returns false, this indicates that JMS should not continue along its course (true indicates that JMS should continue).

Association Run-time Data

In accordance with an embodiment it must be possible to fetch the following run-time information:

1. Total count of messages which have reached the associated interception point
2. Total count of messages which the processor has allowed to continue along its path (the number which have been superseded can be derived, of course)
3. Total messages which are in the process of being handled by the processors
4. The time that the currently associated processor registered
5. Whether the association deactivated (Or shutdown, perhaps due to program failure).

Association Control

In accordance with an embodiment, it must be possible to activate and deactivate an association. As described above, an inactive association is functionally equivalent (with respect to interception) to there being no association configured.

Processor Metadata

In accordance with an embodiment, the interception service configuration can configure processors with metadata.

Java Programming Interfaces

```
public interface InterceptionProcessorMBean extends DeploymentMBean
{
  void setName(String name)
    throws InvalidAttributeValueException;
  String getName( );
  void setType(String type)
    throws InvalidAttributeValueException;
```

-continued

```
  String getType( );
  void setMetaData(String metadata);
  String getMetaData( );
}
public interface AssociationRuntimeMBean extends RuntimeMBean {
  long getTotalMessagesCount( );
  long getContinueMessagesCount( );
  long getInProgressMessagesCount( );
  long getProcessorRegistrationTime( );
  boolean hasProcessor( );
  void activate( );
  void deActivate( );
  boolean isActivated( );
  boolean isProcessorShutdown( );
```

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for message handling using message interceptors on a server, comprising:
    a computer including a microprocessor, a computer readable storage medium, and a server executing thereon;
    one or more message carriers executing on the server, for receiving and handling messages from message producers;
    one or more message processors executing on the server, for processing messages received from the message carriers;
    an interception service at the server, that
        allows message processors to register with the interception service and to be associated with interception points, including specifying a name for each registration,
        maintains a set of associations between the interception points and the message processors, and
        allows message carriers to register interception points for use with message producers, which optionally match the names of registered message processors; and wherein upon receiving a message from a message producer and reaching a particular interception point, each message carrier queries the interception service for message processors registered with the name of the particular interception point, and wherein, if the interception service determines that a message processor is associated with the name of the particular interception point, the interception service then calls the associated message processor, to allow that associated message processor to process the message.

2. The system of claim 1 wherein the system is provided as a server including the message carriers, message processors, and interception service operating thereon, and wherein said server is configured to receive messages as requests from clients.

3. The system of claim 1 wherein at least one of the message carrier is JMS, and wherein each message is a JMS message.

4. The system of claim 1 wherein at least one of the message carrier is a web service.

5. The system of claim 1 wherein the interception service maintains a table of interception points and message processors registered therewith, for use in allowing said message processors to access the message.

6. A method for use with a computer including a microprocessor, a computer readable storage medium, and a server executing thereon, for message handling using message interceptors, comprising the steps of:

providing one or more message carriers, for receiving and handling messages from message producers;

providing one or more message processors, for processing messages received from the message carriers; and providing an interception service at the server, that
allows message processors to register with the interception service and to be associated with interception points, including specifying a name for each registration,
maintains a set of associations between the interception points and the message processors, and
allows message carriers to register interception points for use with message producers, which optionally match the names of registered message processors; and wherein upon receiving a message from a message producer and reaching a particular interception point, each message carrier queries the interception service for message processors registered with the name of the particular interception point, and wherein, if the interception service determines that a message processor is associated with the name of the particular interception point, the interception service then calls the associated message processor, to allow that associated message processor to process the message.

7. The method of claim 6 wherein the system is provided as a server including the message carriers, message processors, and interception service operating thereon, and wherein said server is configured to receive messages as requests from clients.

8. The method of claim 6 wherein at least one of the message carrier is JMS, and wherein each message is a JMS message.

9. The method of claim 6 wherein at least one of the message carrier is a web service.

10. The method of claim 6 wherein the interception service maintains a table of interception points and message processors registered therewith, for use in allowing said message processors to access the message.

11. A computer readable storage medium including instructions stored thereon which when executed by a computer cause the computer to perform the steps of:

reading the instructions from the computer readable storage medium into a computer that include a microprocessor, and a server executing thereon;

providing one or more message carriers, for receiving and handling messages from message producers;

providing one or more message processors, for processing messages received from the message carriers; and providing an interception service at the server, that
allows message processors to register with the interception service and to be associated with interception points, including specifying a name for each registration,
maintains a set of associations between the interception points and the message processors, and
allows message carriers to register interception points for use with message producers, which optionally match the names of registered message processors; and wherein upon receiving a message from a message producer and reaching a particular interception point, each message carrier queries the interception service for message processors registered with the name of the particular interception point, and wherein, if the interception service determines that a message processor is associated with the name of the particular interception point, the interception service then calls the associated message processor, to allow that associated message processor to process the message.

12. The computer readable storage medium of claim 11 wherein the system is provided as a server including the message carriers, message processors, and interception service operating thereon, and wherein said server is configured to receive messages as requests from clients.

13. The computer readable storage medium of claim 11 wherein at least one of the message carrier is JMS, and wherein each message is a JMS message.

14. The computer readable storage medium of claim 11 wherein at least one of the message carrier is a web service.

15. The computer readable storage medium of claim 11 wherein the interception service maintains a table of interception points and message processors registered therewith, for use in allowing said message processors to access the message.

16. The system of claim 1 wherein the one or more message carriers is a plurality of message carriers, and wherein the one or more message processors is a plurality of message processors, and wherein when a message carrier or message processor registers with the interception service it receives a handle to be used by that message carrier or message processor for subsequent communication with the interception service.

17. The method of claim 6 wherein the one or more message carriers is a plurality of message carriers, and wherein the one or more message processors is a plurality of message processors, and wherein when a message carrier or message processor registers with the interception service it receives a handle to be used by that message carrier or message processor for subsequent communication with the interception service.

18. The computer readable storage medium of claim 11 wherein the one or more message carriers is a plurality of message carriers, and wherein the one or more message processors is a plurality of message processors, and wherein when a message carrier or message processor registers with the interception service it receives a handle to be used by that message carrier or message processor for subsequent communication with the interception service.

* * * * *

UNITED STATES PATENT AND TRADEMARK OFFICE
CERTIFICATE OF CORRECTION

PATENT NO. : 7,606,855 B2  Page 1 of 1
APPLICATION NO. : 11/133567
DATED : October 29, 2009
INVENTOR(S) : Shean-Guang Chang It is certified that error appears in the above-identified patent and that said Letters Patent is hereby corrected as shown below:

On the Title page, in field (75), in column 1, in "Inventors", line 1, delete "Morris Plain" and insert -- Morris Plains --, therefor.

In column 2, line 36, delete "SOAP" and insert -- SOAP. --, therefor.

In column 4, line 39, delete "on Shutdown" and insert -- onShutdown --, therefor.

In column 5, line 43, delete "process only" and insert -- processOnly --, therefor.

Signed and Sealed this

Tenth Day of August, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,606,855 B2 | |
| APPLICATION NO. | : 11/133567 | |
| DATED | : October 20, 2009 | |
| INVENTOR(S) | : Shean-Guang Chang | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1129 days.

Signed and Sealed this

Twelfth Day of October, 2010

David J. Kappos
*Director of the United States Patent and Trademark Office*

UNITED STATES PATENT AND TRADEMARK OFFICE
Certificate

Patent No. 7,606,855 B2

Patented: October 20, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Shean-Guang Chang, Morris Plains, NJ (US); and Lawrence Feigen, Watchung, NJ (US).

Signed and Sealed this Fifteenth Day of March 2011.

NATHAN FLYNN
*Supervisory Patent Examiner*
Art Unit 2454
Technology Center 2400